(12) United States Patent
Mazloum et al.

(10) Patent No.: US 12,004,178 B2
(45) Date of Patent: Jun. 4, 2024

(54) METHOD FOR CONTROL SIGNALING IN A WIRELESS COMMUNICATION SYSTEM

(71) Applicant: SONY GROUP CORPORATION, Tokyo (JP)

(72) Inventors: Nafiseh Mazloum, Lund (SE); Rickard Ljung, Helsingborg (SE); Basuki Priyanto, Lund (SE)

(73) Assignee: Sony Group Corporation, Tokyo (JP)

( * ) Notice: Subject to any disclaimer, the term of this patent is extended or adjusted under 35 U.S.C. 154(b) by 417 days.

(21) Appl. No.: 17/413,206

(22) PCT Filed: Jan. 8, 2020

(86) PCT No.: PCT/SE2020/050006
§ 371 (c)(1),
(2) Date: Jun. 11, 2021

(87) PCT Pub. No.: WO2020/167191
PCT Pub. Date: Aug. 20, 2020

(65) Prior Publication Data
US 2022/0053543 A1    Feb. 17, 2022

(30) Foreign Application Priority Data
Feb. 15, 2019  (SE) .................................... 1950186-5

(51) Int. Cl.
*H04W 72/23*     (2023.01)
*H04W 52/02*     (2009.01)
*H04W 72/1273*   (2023.01)

(52) U.S. Cl.
CPC ....... *H04W 72/23* (2023.01); *H04W 52/0229* (2013.01); *H04W 72/1273* (2013.01)

(58) Field of Classification Search
CPC ............. H04W 72/23; H04W 52/0229; H04W 72/1273
See application file for complete search history.

(56) References Cited

U.S. PATENT DOCUMENTS

| 2010/0215004 A1* | 8/2010  | Yoo ...................... H04L 1/0031 370/329 |
| 2017/0171841 A1* | 6/2017  | Chen ..................... H04L 1/1812 |
| 2018/0227889 A1  | 8/2018  | Yang |
| 2018/0317234 A1  | 11/2018 | Lindoff |

FOREIGN PATENT DOCUMENTS

| CN | 105340206 A | 2/2016 |
| CN | 107371272 A | 11/2017 |

(Continued)

OTHER PUBLICATIONS

International Search Report and Written Opinion from corresponding International Application No. PCT/SE2020/050006, dated Mar. 20, 2019, 11 pages.

(Continued)

*Primary Examiner* — Hashim S Bhatti
(74) *Attorney, Agent, or Firm* — Tucker Ellis LLP

(57) ABSTRACT

A solution for signaling control information between a network node (10) and a UE (1) in a wireless communication system, which includes a method carried out in the network node, comprising transmitting (S101), to the UE on a control channel, first control information (S1) associated with a first transmission (S2) between the network node and the UE; transmitting (S103, S104), to the UE, an indication signal (S3) instructing the UE to reuse obtention information (DCI1, PAR) associated with the first control information for a further transmission between the network node and the UE. The indication signal may instruct the UE to reuse the first control information (DCI1) as said obtention information, or the obtention information may be indicative of a decoding parameter (PAR) to be used for decoding further control information (S4).

16 Claims, 6 Drawing Sheets

(56) References Cited

FOREIGN PATENT DOCUMENTS

| CN | 108141330 A | 6/2018 |
| CN | 108631929 A | 10/2018 |
| CN | 108781368 A | 11/2018 |
| WO | 2017193376 A1 | 11/2017 |
| WO | 2018059693 A1 | 4/2018 |
| WO | WO-2018060759 A1 | 4/2018 |
| WO | 2018077877 A1 | 5/2018 |
| WO | WO-2018127339 A1 | 7/2018 |
| WO | WO-2018142264 A1 | 8/2018 |

OTHER PUBLICATIONS

Zte, et al., "PDCCH procedure and DCI carried by PDSCH region", 3GPP TSG RAN WG1 Meeting #88, R1-1701588, Feb. 13-17, 2017, 4 pages.

Office Action and Swedish Search Report from corresponding Swedish Application No. 1950186-5, dated Oct. 14, 2019, 8 pages.

Sony, "Triggering UE adaptation using a PDCCH-based power saving channel", 3GPP TSG RAN WG1 #96bis, R1-1905474, Apr. 8-12, 2019, 10 pages.

3GPP, "Technical Specification Group Radio Access Network; NR; Multiplexing and channel coding (Release 15)", 3GPP TS 38.212 V15.4.0, Dec. 2018, 100 pages.

3GPP, "Technical Specification Group Radio Access Network; NR; Physical layer procedures for control (Release 15)", 3GPP TS 38.213 V15.4.0, Dec. 2018, 104 pages.

3GPP, "Technical Specification Group Radio Access Network; NR; Radio Resource Control (RRC) protocol specification (Release 15)", 3GPP TS 38.331 V15.4.0, Dec. 2018, 474 pages.

Huawei HiSilicon, "Control signalling design for UL MIMO", Oct. 5, 2010, 3GPP tsg_ran WG1_RL1, TSGR1_62b, R1-105136.

* cited by examiner

METHOD FOR CONTROL SIGNALING IN A WIRELESS COMMUNICATION SYSTEM

TECHNICAL FIELD

This disclosure relates to methods and devices for control signaling in a wireless communication system. Specifically, solutions are provided for reusing information associated with downlink signaling between a network node and a terminal.

BACKGROUND

In radio communication systems, such as various generations provided through the 3rd Generation Partnership Project (3GPP), various specifications have been provided for setting up common rules for setting up and operating both a wireless radio interface between a wireless terminal and a network node, and various levels of operation of the network. In 3GPP documentation, a terminal is commonly referred to as a User Equipment (UE), but will alternatively simply be referred to herein as a terminal. Such terminals are connectable to a core network by means of a radio access network RAN, which includes one or more network nodes, operative to provide radio access to terminals within a cell. Such a network node may also be referred to as an access node or a base station, and various terms are used in 3GPP for different types of systems or specifications. In the so-called 4G specifications, also referred to as Long-Term Evolution (LTE), the term eNodeB (eNB) is used to denote a network node.

After successful implementation and use of the 4G communication system, efforts to develop an improved 5G communication system or a pre-5G communication system have been conducted. For this reason, the 5G communication system or the pre-5G communication system is called a communication system beyond 4G network, and also New Radio (NR). A network node configured to operate in a 5G radio access network may be denoted a gNB.

In wireless systems, such as NR, scheduling of data is managed and signaled to the UE by a network node via so-called downlink control information (DCI) signaled within the physical downlink control channel (PDCCH), e.g. as described in TS 38.212 V15.4 (2018-12) section 7.3. Presently, NR provides for several available DCI formats. One such format type allows for large flexibility in bandwidth, modulation, antenna configuration etc. Other format types are more compact, where a smaller number of parameters are transmitted. For both these cases, the use of DCI to indicate to the UE the configuration for an upcoming data transmission, e.g. on a physical downlink shared channel (PDSCH), requires that the UE to perform so-called PDCCH monitoring, as described in e.g. TS 38.213 v15.4 (2018-12) section 10.1. The PDCCH monitoring is well known to be an energy-consuming activity in the UE, primarily since the information can occur within a given frequency range and the UE needs to perform so-called blind decoding to detect the PDCCH.

A known procedure is an LTE functionality denoted semi-persistent scheduling (SPS) which is also used in 5G NR. With this prior art method, the network can preconfigure multiple scheduling occurrences without any per-occurrence dedicated control signaling (PDCCH) for resource allocation or similar. Such SPS configuration may be informed to the UE in RRC message, TS 38.331 V15.4 (2018-12) section 6.3, and the SPS activation/deactivation is informed in DCI, TS 38.213 V15.4 (2018-12) section 10.2.

However, while semi persistent scheduling reduces the need for PDCCH monitoring, it does not have any flexibility in the scheduling since it pre-schedules all the upcoming occurrences with a given time interval between scheduling occurrences. Hence it is only suitable for fully repeated data transfer with similar packet size and inter-arrival time use cases such as voice calls (VoIP) or similar.

Consequently, there still exists an objective of improving control signaling in a wireless communication system control signaling in wireless communication systems, both in terms of minimizing the use of the air interface, which is increasingly crowded due to the growing number of wireless devices, and in terms of UE power consumption.

SUMMARY

To address the above-discussed objectives, a solution is hereby provided as outlined in the attached independent claims. Further advantageous embodiments are laid out in the dependent claims.

According to a first aspect, a method is provided for signaling control information from a network node to a UE in a wireless communication system, comprising transmitting, to the UE on a control channel, first control information associated with a first transmission of first data between the network node and the UE;

transmitting, to the UE, an indication signal instructing the UE to reuse obtention information associated with the first control information for a further transmission of second data between the network node and the UE, wherein the second data is different from the first data.

By instructing the UE to reuse obtention information, thereby effectively pointing to information already available in the UE, the UE is efficiently configured to handle further transmission from the network node while dispensing with energy-demanding processes for gaining obtention information from signals received from the network node.

In one embodiment, the method comprises transmitting first data to the UE, wherein the first control information is associated with receiving the first data in the UE; and transmitting second data from the network node to the UE, wherein said indication signal instructs the UE to reuse the obtention information for receiving the second data in the UE.

Rather than sending control information before each data transmission, and the UE blindly decoding that control information, an instruction to actually reuse previous control information, or decoding parameters for more easily decoding further control information, may be provided.

In one embodiment, said indication signal instructs the UE to reuse the first control information as said obtention information. The network node may thus dispense with transmitting specific control information associated with the second data transmission, thereby also obtaining a network signaling load reduction.

In one embodiment, said indication signal instructs the UE to reuse last received control information. This means that the indication signal may represent a simple one-bit information, which may be easily conveyed to the UE.

In one embodiment, said indication signal specifically instructs the UE to reuse control information identified as transmitted with said first control information for receiving the second data in the UE. In such an embodiment, the indication signal may specifically point to one of a plurality of previous sets of received control information, such as downlink control information, received in association with different received data transmissions. This adds a level of flexibility to the network, in that the network node may instruct the UE to use different control information for receiving successive data transmissions, even without having to convey new full control information.

In one embodiment, said indication signal is transmitted in lieu of control information dedicated to the second data transmission. This may result in obtaining a network signaling load reduction.

In one embodiment, the method comprises transmitting second control information associated with the second data transmission.

In one embodiment, said obtention information is indicative of a decoding parameter to be used for decoding the second control information. Even though network load is not reduced, energy-demanding processes ion the UE are nevertheless obtained, e.g. by avoiding blind decoding.

In one embodiment, said indication signal instructs the UE to reuse a last used decoding parameter for decoding control information. This means that the indication signal may represent a simple one-bit information, which may be easily conveyed to the UE In one embodiment, said indication signal instructs the UE to reuse a decoding parameter identified by the UE as used for decoding the first control information.

In one embodiment, said indication signal is multiplexed with the second control information.

In one embodiment, the indication signal is uncoded.

In one embodiment, the indication signal is detectable by correlation in the UE.

In one embodiment, the indication signal is a predetermined signal, adapted to indicate a reuse instruction.

In one embodiment, the indication signal is a sequence.

In one embodiment, the indication signal comprises at least one of a predetermined sequence, a phase-shifted signal, a cover-coded signal, a wakeup signal.

In one embodiment, the method comprises transmitting configuration information for receipt in the UE related to the indication signal.

In one embodiment, the method comprises transmitting activation information for receipt in the UE, indicating activation or deactivation of indication signal transmission.

According to a second aspect, a method is provided for use in a UE for signaling with a network node in a wireless communication system, comprising
receiving, from the access node on a control channel, first control information associated with a first transmission of first data from the network node;
receiving, from the access node, an indication signal instructing the UE to reuse obtention information associated with the first control information for obtaining second data from a second transmission from the network node, wherein the second data is different from the first data;
using the obtention information to obtain the second data.

In one embodiment, the method comprises processing the first control information to determine scheduling for receiving data;
receiving first data from the access node; and
receiving second data from the network node, wherein said indication signal indicates to the UE to reuse the first control information as said obtention information for receiving the second data.

In one embodiment, said indication signal indicates to the UE to reuse last received control information.

In one embodiment, said indication signal specifically instructs the UE to reuse control information identified as received with said first control information for receiving the second data.

In one embodiment, said indication signal is received in lieu of control information specifically associated with the second data.

In one embodiment, the method comprises receiving second control information associated with the second data.

In one embodiment, said obtention information is indicative of a decoding parameter to be used for processing the second control information.

In one embodiment, said indication signal indicates to the UE to reuse a decoding parameter last used for processing control information.

In one embodiment, said indication signal instructs the UE to reuse a decoding parameter identified by the UE as used for processing the first control information.

In one embodiment, said indication signal is multiplexed with the second control information.

In one embodiment, the indication signal is detected by correlation in the UE.

In one embodiment, the indication signal is uncoded.

In one embodiment, the indication signal is a predetermined signal, adapted to indicate a reuse instruction.

In one embodiment, the indication signal is a sequence.

In one embodiment, the indication signal comprises at least one of a predetermined sequence, a phase-shifted signal, a cover-coded signal, a wakeup signal.

In one embodiment, the method comprises receiving configuration information related to the indication signal.

In one embodiment, the method comprises receiving activation information, indicating activation or deactivation of indication signal transmission from the access node.

According to a third aspect, a network node is provided, configured for communication with UE in a wireless communication system, the network node comprising logic configured to carry out any of the preceding steps.

In one embodiment, the network node comprises
a transceiver configured to send and receive data; and
wherein the logic comprises a control unit including a processing device, and a data memory holding computer program code, wherein the processing device is configured to execute the computer program code to carry out any of said steps.

According to a fourth aspect, a UE is provided, configured for communication with network node in a wireless communication system, the UE comprising logic configured to carry out any of the steps of the preceding steps.

In one embodiment, the UE comprises
a transceiver configured to send and receive data; and
wherein the logic comprises
a control unit including a processing device, and
a data memory holding computer program code, wherein the processing device is configured to execute the computer program code to carry out any of said steps.

BRIEF DESCRIPTION OF THE DRAWINGS

Various embodiments will be described with reference to the drawings, in which
FIG. 1 schematically illustrates a network of a wireless communication system including networks nodes according to various embodiments.

DETAILED DESCRIPTION

Figure 1:
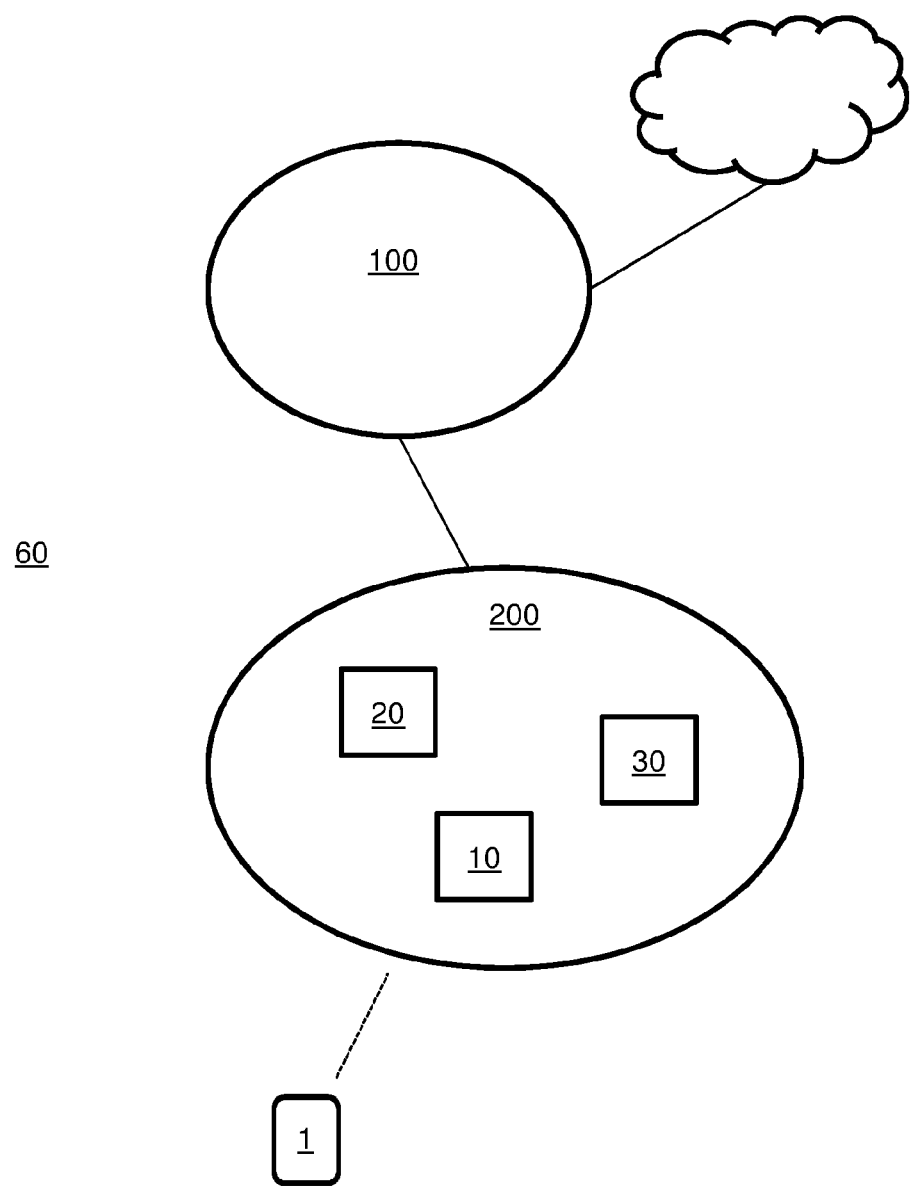

The invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

Various embodiments are outlined herein, generally suitable for employment in a NR 3GPP radio communication system, but any type of radio communication system including network nodes capable of and configured to employ signaling to UEs to convey control information.

From a UE power consumption perspective, and also from a network signaling load perspective, it would be beneficial if signaling were made more efficiently. Specifically, it would be advantageous if PDCCH monitoring could be minimized or even dispensed with, or otherwise more efficient. Various solutions targeting these problems and objectives are presented herein, and embodiments configured to realize such solutions will be described with reference to the drawings. To set the scene and context of such embodiments, the wireless system and various components thereof will first be described by example. The description mainly outlines the function and benefit of embodiments associated with PDCCH monitoring. However, the concepts described may alternatively be applied for reuse of other control signaling transmitted from a network node.

FIG. 1 schematically illustrates a wireless communication system 60, including an access network 200. The access network 200 is in turn connected to a core network (CN) 100, which provides access to other communication networks, such as the Internet. The access network 200 may include a plurality of access nodes 10, 20, 30 configured to serve various cells. The access network 200 may e.g. be a Radio Access Network (RAN). A UE 1 is a wireless device configured to communicate wirelessly with access nodes of the access network 200, such as by radio. UEs may be stationary or mobile.

Each access node 10, 20, 30 may in various embodiments be referred to as a base station, serving one cell each. In certain embodiments the access network 200 may comprise a number of subareas, which may be referred to as RAN Notification Areas (RNA). Each RNA may consist of a number of cells, where each cell is served by one access node 20. One of those cells may be referred to as an anchor cell. The anchor cell includes the access node 10 that has configured interface to the core network 100 for Control plane and User plane, referred to as N2 and N3 interfaces in 5G. Corresponding interfaces S1-C and S1-U are provided in LTE. The access nodes 20, 30 of the other cells of the RNA may be connected to the anchor cell 10 by means of a logical inter-node interface 201. In 5G, this interface, or set of interfaces, is referred to as Xn interface, and has a similar purpose as the X2 interface defined for LTE.

The CN 100 may include various core network nodes comprising entities, nodes or functions defined in accordance with a certain 3GPP release or in accordance with another set of wireless communication standards. Such CN entities may e.g. include a node for handling mobility of UEs, such as an Access & Mobility management Function (AMF) and Session Management Function (SMF). The CN may further include a User Plane Function UPF, or gateways, such as one or more of a Serving Gateway and a PDN Gateway.

Figure 2:
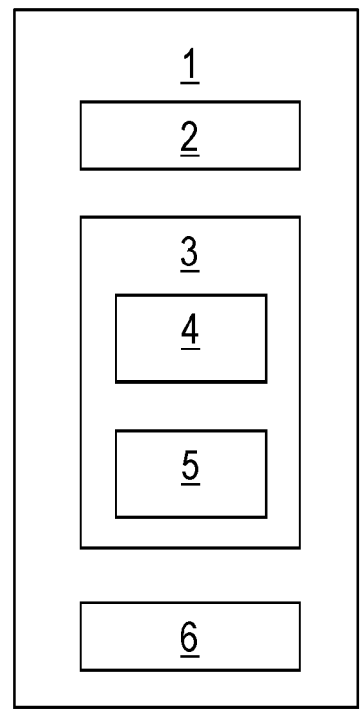
FIG. 2 schematically illustrates elements included in a UE configured in accordance with various embodiments.

FIG. 2 schematically illustrates a UE 1. The UE 1 may be configured for communication with an access network 200, and comprise a transceiver 2, such as a radio receiver and transmitter for communicating with the access network 200 through at least an air interface. The terminal 1 further comprises a logic 3. The logic 3 may comprise for example a controller or microprocessor 4. The logic may also comprise or be connected to a data storage device 5 configured to include a computer readable storage medium. The data storage device 5 may include a memory and may be, for example, one or more of a buffer, a flash memory, a hard drive, a removable media, a volatile memory, a non-volatile memory, a random access memory (RAM), or other suitable device. In a typical arrangement, the data storage device 5 includes a non-volatile memory for long term data storage and a volatile memory that functions as system memory for the controller 4. The data storage device 5 may exchange data with a processor 4 of the logic 3 over a data bus. The data storage device 5 is considered a non-transitory computer readable medium. One or more processors of the logic 3 may execute instructions stored in the data storage device or a separate memory in order to carry out operation of the UE 1, as outlined herein. The UE 1 may further comprise a data memory 6 for storing data including control information and/or parameters associated with obtainment of such control information from the access network 200. The data memory 6 may be or form part of the data storage device 5, or be a separate entity, but is specifically indicated in the drawing to identify the intended difference between storing code associated with a computer program or operating system in data storage 5 used for controlling and operating the UE 1, from data associated with control information. It may be noted that the UE 1 clearly may include other features and functions than those identified, such as e.g. one or more antennas, a user interface, a power source and so on, but these components are not shown in FIG. 2 for clarity reasons.

Figure 3:
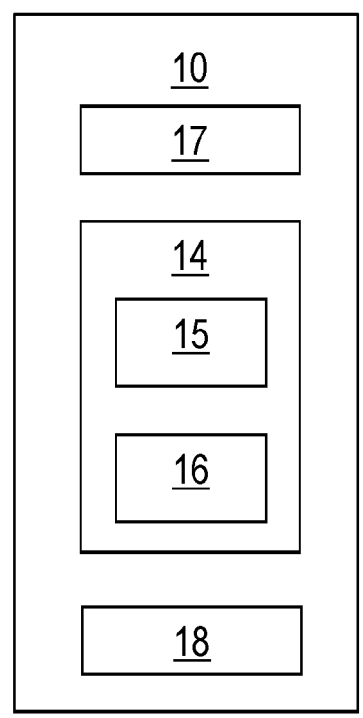
FIG. 3 schematically illustrates elements included in a network node configured in accordance with various embodiments.

FIG. 3 schematically illustrates an access node 10, also referred to herein as a first access node 10. In various embodiments, the first 10 access node may be similar or even identical to access nodes 20 and 30, shown in FIG. 1. In terms of functional entities, the first access node 10 comprises an access node logic 14. The access node logic 14 may comprise for example a controller or microprocessor 15. The logic 14 may also comprise or be connected to a data storage device 16 configured to include a computer readable storage medium. The data storage device 16 may include a memory and may be, for example, one or more of a buffer, a flash memory, a hard drive, a removable media, a volatile memory, a non-volatile memory, a random access memory (RAM), or other suitable device. In a typical arrangement, the data storage device 16 includes a non-volatile memory for long term data storage and a volatile memory that functions as system memory for the control unit. The data storage device 16 may exchange data with a processor of the logic 14 over a data bus. The data storage device is considered a non-transitory computer readable medium. One or more processors 15 of the logic 14 may execute instructions stored in the data storage device or a separate memory in order to carry out operation of the access node 10, as outlined herein. Each access node 10 may comprise more components, for example a power supply, but these components are not shown in FIG. 3 for clarity reasons. The access node 10 may further comprise one or more communication interfaces 17 for communication with other entities. For example, the communication interfaces 17 may comprise a radio transceiver connected to an antenna arrangement (not shown), for communication over an air interface with the UE 1. Moreover, the communication interfaces 17 may define one or more interfaces to the core network 100. The access node 10 may further comprise a data storage 18 for storing UE further data associated with information dedicated to one or mode UEs.

Figure 4:
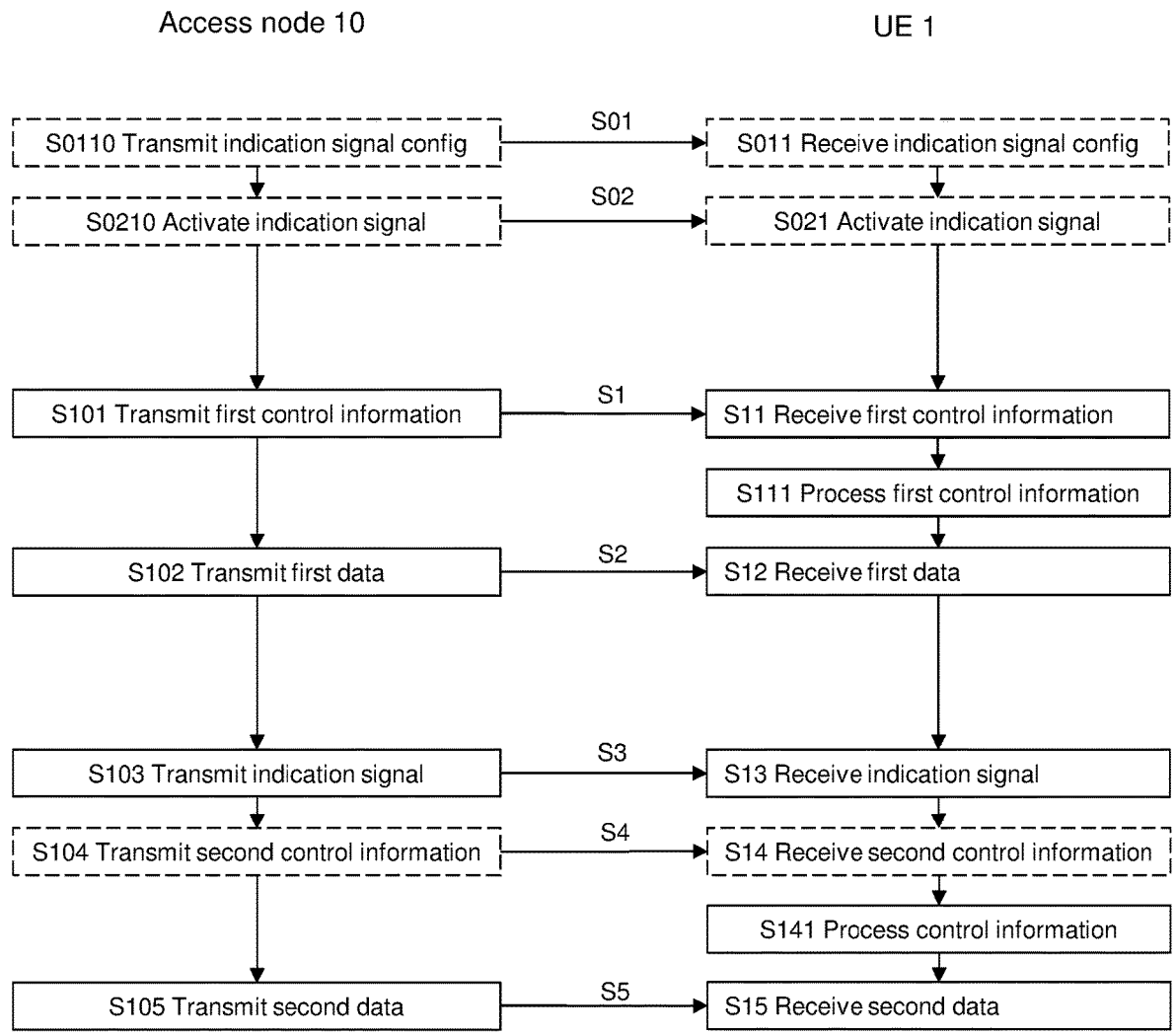
FIG. 4 shows a signaling scheme including several method steps carried out in different embodiments and in various nodes in a wireless communication system.

FIG. 4 schematically illustrates various steps, signals and data transmissions carried out in accordance with various embodiments. Herein, steps carried out by an access node 10 are depicted to the left, and steps carried out by a UE 1 are depicted to the rights. It shall be noted that not all steps or signals need to be included in every embodiment, but the same drawing will be referred to for the sake of convenience. Further reference will be made to FIGS. 5-9 for describing further differences between embodiments.

In accordance with a first general aspect, a method is provided for signaling control information from a network node 10 to a UE 1 in a wireless communication system 60.

The method may comprise a step of the network node 10 transmitting S101 first control information S1 to the UE 1 on a control channel, which control information is associated with a first transmission S2 between the UE and the network node. The first control information may e.g. include any information related to preferred or required configuration of the UE 1 to be able to detect, receive or decode the first transmission S2, such as demodulation scheme, resource allocation, power control command, coding rate information etc. The first control information may e.g. be DCI.

The first control information S1 is preferably transmitted such that it is understood to be associated with the first transmission S2, such as a data transmission. This association may be configured such that the control information S1 identifies scheduling or resource allocation for the first transmission S2.

The method may further comprise transmitting S103, S104 an indication signal S3 to the UE 1, instructing the UE 1 to reuse obtention information associated with the first control information for a further transmission between the UE and the network node. The indication signal S3 is a comparatively much simpler signal than the first control information S1. Preferably, the indication signal S3 does not include any information in itself, which can be directly used to detect or decode a further transmission, such as a further data transmission. Rather, the indication signal S3 is a low complexity signal, which is detected and understood in the UE 1 as an instruction to reuse obtention information that it already available in the UE 1.

In this context, obtention information may be any information or data usable for the UE 1 to obtain data or information from a transmission from the network node 10, e.g. a forthcoming transmission S5. In various embodiments, the obtention information may be information related to previously received DCI, or parts of information included in such a DCI, such as scheduling or modulation. In other alternatives, the obtention information may include data for receiving, detecting, or decoding further control information S4 associated with the forthcoming transmission S5. Such obtention information may simplify the process of determining the further control information S4 in the UE 1, thus saving energy.

In accordance with a second general aspect, a method is provided for use in a UE for signaling with a network node 10 in a wireless communication system 60.

The method may comprise a step of receiving S11, from the access node 10 on a control channel, first control information S1 associated with a first transmission S2 from the network node.

The method may further comprise receiving S13, from the access node, an indication signal S3 instructing the UE to reuse obtention information associated with the first control information for obtaining data from a further transmission from the network node.

The method according to these general aspects thus provides an instruction to the UE to reuse information previously obtained, thereby minimizing requirements placed on the UE, and in various embodiments also over the air signaling. By instructing the UE to reuse obtention information, thereby effectively pointing to information already available in the UE, the UE may dispense with energy-demanding processes for gaining that information from signals received from the access node. Various embodiments falling within the scope of these general aspects will be described below, for which the benefits and advantages will become clearer.

According to some embodiments, a solution is provided which allows a UE 1 to dispense with reading a control channel. Specifically, a mechanism may be added to allow for a UE 1 to skip the reading of downlink control signaling, e.g. the physical downlink control channel PDCCH, when the network reuses the same control signaling information. In this context, the control signaling information may include e.g. scheduling assignment. The mechanism may thus entail configuring the UE 1 to reuse scheduling assignment as defined by a previous scheduling, received in a control signal previously transmitted from the network node 10. Hence, the system 60 can obtain reduced downlink signaling load and at the same time the UE 1 can reduce the need for e.g. energy-consuming PDCCH monitoring. This configuration is obtained by the means of the network node 10 transmitting the indication signal S3, and the UE receiving the indication signal to gain the instruction from the network node 10 to reuse obtention information associated with the first control information for a further transmission. In one example the UE may reuse information indicative of time, frequency, modulation or coding of an upcoming transmission. This may e.g. relate to receiving S15 second data S5 in the UE 1.

In such an embodiment, transmission S101 of the first control information S1 is directly associated with a subsequent transmission S102 of first data S2 to the UE 1, wherein the first control information S1 is or includes Downlink Control Information DCI1 associated with receiving the first data S2 in the UE 1. The transmission 101 of the first control information S1 is thus succeeded by the transmission S102 of the associated first data S2. Before being able to receive and obtain the first data S2, the UE 1 may need to process S111 the received first control information, such as to decode the PDCCH on which the DC1 is transmitted. This may e.g. be carried out using blind decoding, or optionally by any of the methods described below, i.e. by reusing a decoding parameter with reference to a previous transmission from the network node.

When a second data transmission S5 is to be carried out from the network node 10 to the UE 1, then rather than sending second control information specifically associated with that second data transmission S5, the network node 10 transmits S103 the indication signal S3. When received in the UE 1, the indication signal S3 will form an instruction for the UE 1 to reuse the DCI1 as obtention information. The UE 1 will thus be able to configure its transceiver for reception of the second data transmission S5, using data or settings as provided in the already obtained DCI1, by processing S141 the control information DCI1. In various embodiments, received obtention information such as DCI may be stored in a data storage 6 in the UE 1, for the purpose of future use and configuration of a receiver 2 as in step S141, e.g. as outlined with reference to the present embodiment.

Figure 5:
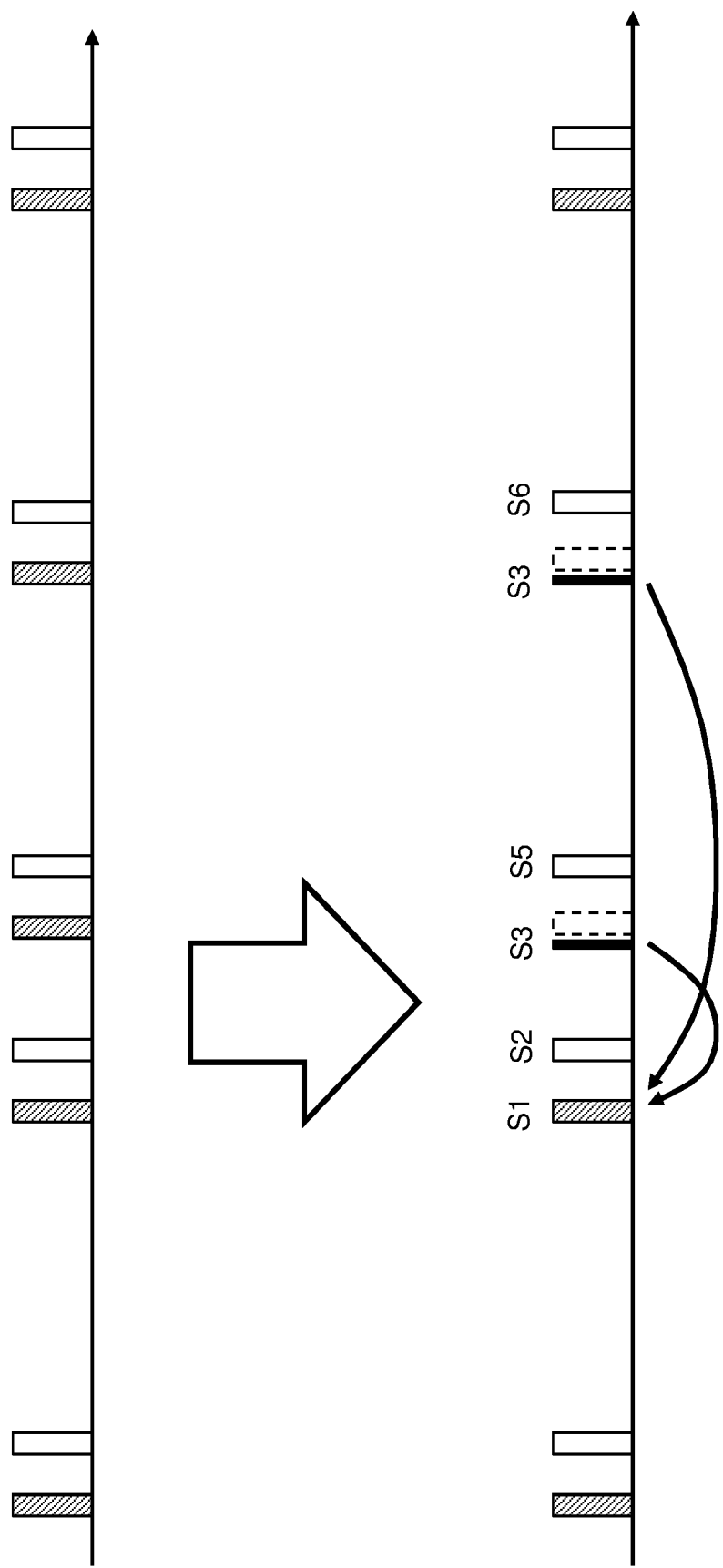
FIG. 5 schematically illustrates signaling from a network node in accordance with one embodiment.

FIG. 5 schematically illustrates a scheme of transmission of control information and data from a network node 10 in accordance with a first embodiment. The drawing shows a progression axis, which may indicate time. Control information is transmitted in the dashed boxes, e.g. in PDCCH, whereas data is transmitted in the white boxes with full lines, e.g. in PDSCH.

It may be noted that the upper drawing illustrates a scenario without including the features of the first embodiment. In this scenario, each data transmission is preceded with an associated control information PDCCH transmission including the DCI required for the UE 1 to obtain the associated subsequent data transmission.

The lower drawing shows a corresponding scenario configured with features of the first embodiment. In this example, first control information S1 is transmitted, e.g. on PDCCH, and includes DCI1 for use in the UE 1 for obtaining the subsequently transmitted data S2. When a next, second, data transmission S105 is to be carried out by the network node 10, and the network node 10 determines that the same configuration may be employed, as defined by DCI, the indication signal S3 is transmitted in lieu of a second control signal including DCI specifically associated with the second data transmission S105. The indication signal is shown as a narrow black line in the drawing, whereas the absent control signal carrying DCI is shown as a box with a dashed contour. Indeed, in its simplest deployment, the indication signal needs only to convey information corresponding to one bit, i.e. presence or absence of the indication signal S3. If the indication signal S3 is detected in the UE 1, that alone may be determined as an instruction to reuse DCI1. This also effectively serves as an instruction to the UE 1 to not carry out any blind decoding. Reuse of DCI1 may be accomplished by processing S141 control information, by e.g. retrieving data associated with DCI1 saved in data storage 6, or by simply maintaining a setting of the transceiver 2 as configured by the last received DCI1. FIG. 5 also indicates a third data transmission S6, subsequent to the second data transmission S5. Also in this case, the network node 10 has determined that a current configuration as specified by DCI1 may be employed, and the third data transmission S6 is thus also preceded by an indication signal S3 indicating reuse of DCI.

Figure 6:
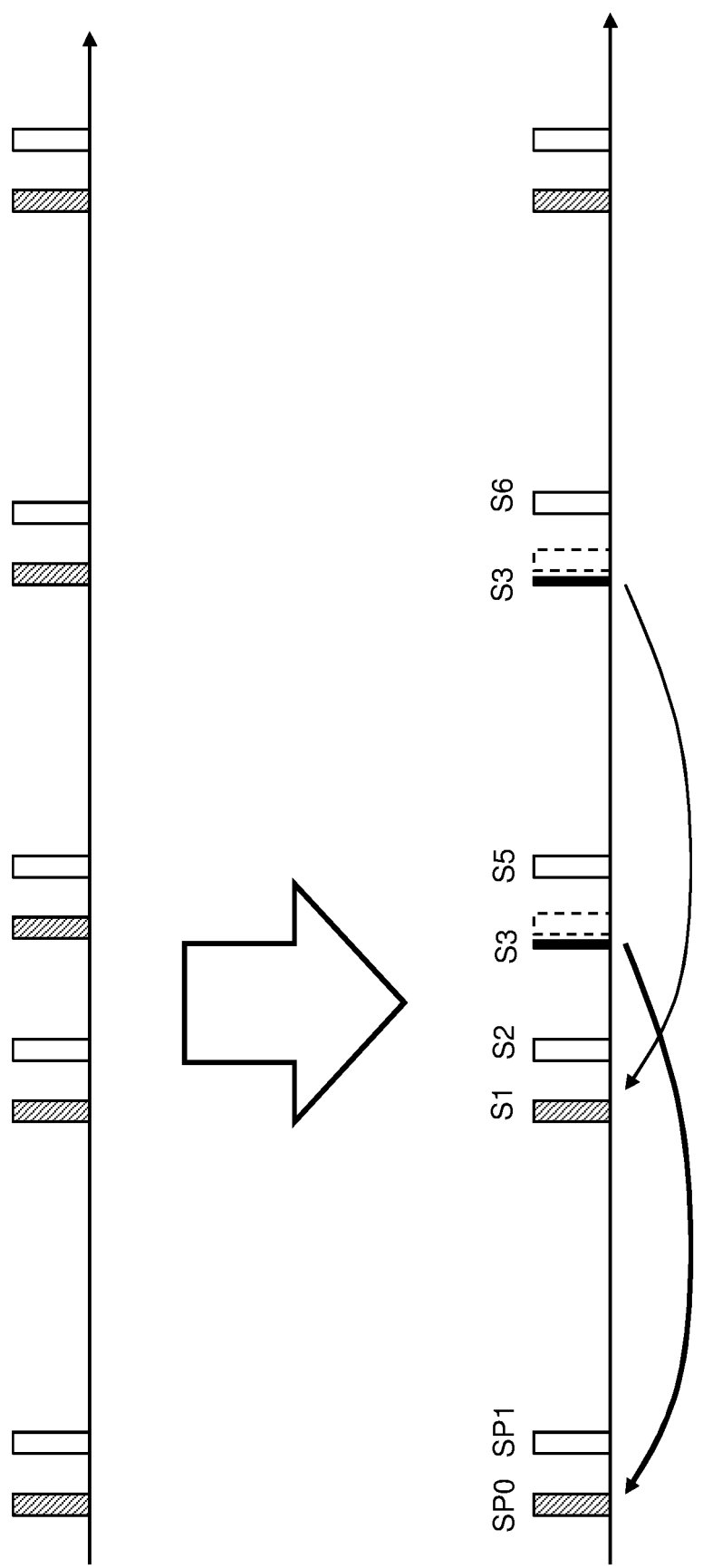
FIG. 6 schematically illustrates signaling from a network node in accordance with an alternative embodiment.

FIG. 6 schematically illustrates a second embodiment, in a similar manner as in FIG. 5. In this embodiment, the method is implemented to not only indicate reuse of previous control information, such as DCI carried in PDCCH, representing the last used scheduling assignment. Rather, the indication signal S3 identifies an instruction to the UE 1 to reuse control information, such as DCI1, specifically identified as transmitted with a certain previous transmission, such as S101. With such a method, PDCCH information to be referred to later, by means of the indication signal S3, may e.g. be given an index by adding a separate index field in the DCI information elements, which may be obtained by the UE 1 once that DCI is decoded. The indication signal S3 is further configured to include information indicative of the specific index, which informs the UE 1 which one of earlier transmitted DCI will be reused for the upcoming transmission S5. In one example, such index may be used by the network to assign different index to two or more different DCI transmissions. Further the network may select and refer to one out of the multiple different earlier transmitted DCIs, in order to achieve a flexibility in scheduling while still being able to reduce PDCCH decoding in the UE.

In the example of FIG. 6, the UE 1 has already received a previous data transmission SP1, a 0th data transmission, while being configured with control information DCIP received in a preceding control signal SP0, from the network node 10. Later, the UE 1 has furthermore received a data transmission S2, also referred to as the first data transmission, under configured with DCI1 received in a preceding control signal S1, from the network node 10. When the network node 10 is to transmit S105 second data S5, it may determine that DCI data may be reused so as to instruct the UE 1 to obtain a setting corresponding to a preceding control information transmission. Specifically, in the example of FIG. 6, the DCIP may be reused. An indication signal S3 is thus transmitted, in lieu of new control information carrying DCI, i.e. skipping specific DCI transmission for the second data S5 transmission S105. Instead, the indication signal S3 is transmitted S103 to instruct the UE 1 to reuse the DCIP for receiving the second data S5. This may be configured by including, in the indication signal S3, an identification of an index specifically associated to DCIP. This identification may be read and used by the UE 1 in a processing step S141 to obtain the associated DCIP from memory storage 6, where previously obtained DCI is saved. The UE 1 may thus be configured using the DCIP, and thereby receive the second data S5.

Before a subsequent data transmission S6, the network node 10 may determine that instead the DCI1 may conveniently be employed. The network node 10 thus transmits an indication signal S3, containing an identification of DCI1, which again may be obtained by the UE 1 from data storage 6 and subsequently be used to configure the UE 1 to receive the subsequent data S6.

Figure 7:
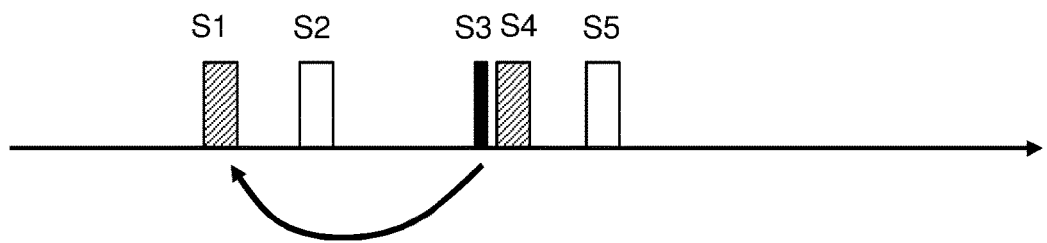
FIG. 7 schematically illustrates signaling from a network node in accordance with another alternative embodiment.

FIG. 7 schematically illustrates a third embodiment, in a similar presentation as the lower drawings of FIGS. 5 and 6. However, in the embodiment of FIG. 7, a step of transmitting S104 second control information S4 is carried out, such as DCI2, associated with the transmission S105 of the second data S5. In other words, the indication signal S3 is transmitted in addition to control information associated with the second data S5. This embodiment still provides the technical effect of simplified decoding of the control information S4, as e.g. transmitted on a control channel PDCCH. As indicated earlier, PDCCH blind decoding consumes a lot of UE energy. The UE tries to blind-decode based on certain parameters and its possible values. The parameters may e.g. include aggregation levels (AL), PDCCH candidate locations, and DCI format types. The legacy state of the art procedure is as described in TS 38.213 V15.4 (2018-12) section 10.1. A solution is thus proposed for simplifying the required decoding for the UE 1. This involves implementing a mechanism of configuring the indication signal S3 to instruct the UE 1 to reuse the obtention information for receiving the second data S5 in the UE 1, wherein said obtainment information is indicative of a decoding parameter PAR to be used for decoding the second control information S4. In other words, the indication signal may represent the set of PDCCH decoding parameters used for decoding previous control information, such as first control information S1.

Thus, the UE 1 still needs to decode the subsequent PDCCH S4, but this may be accomplished with less effort, i.e. no blind decoding or semi-blind decoding, as the PDCCH parameters are known. As an example: a previous PDCCH S1 may be configured with AL=4, PDCCH candidate location 4, and DCI format 1. Receipt of the indication signal S3 in the UE 1 is then interpreted as actually representing that configuration information, as the indication signal instructs the UE to reuse a decoding parameter or value PAR, as obtention information, which has been used for decoding previous control information, such as the first DCI1. In such an embodiment, once the UE 1 detects the indication signal, it may thus decode the subsequent PDCCH S4 with the existing decoding parameter or value PAR, in a processing step S141, thereby avoiding blind decoding. A benefit of this embodiment is that the second control information S4, e.g. PDCCH, may carry different payload than the previous control information S1, such as different PDSCH resource allocation, MCS, etc.

In the various embodiments described, the indication signal S3 is preferably a low complexity signal. The main property of this signal S3 is simple detection by the UE 1. If decoding is at all required, requirements shall be simpler than PDCCH decoding. In various embodiments, the indication signal S3 is detectable in the UE 1 by a correlation operation.

In various embodiments, the indication signal S3 may be a predetermined sequence. As an example, the indication signal may be configured as one of a phase-shifted signal, a cover-coded signal, or a sequence. Preferably, the indication signal S3 is detectable by performing correlation in the UE 1. Parameters like phase may be used for conveying information with the indication signal S3. The information may, in its simplest form, be the mere detection and identification that it is in fact an indication signal S3. In alternative embodiments, further information may be carried in the indication signal S3, such as an identification of an index pointing to an identified previously received set of control information, such as DCI, as described with reference to FIG. 6. The indication signal S3 can e.g. be a Zadoff-Chu (ZC) sequence, a Pseudo-random Noise (PN) sequence, or similar. The indication signal S3 may e.g. be configured similar to an MTC wake-up signal, MWUS, as defined in 3GPP document TS 36.211 section 6.11B. In various embodiments, where the indication signal S3 may be configured as a wake-up signal, the UE 1 may be configured with a receiver 2 for comparatively simple operation. In such an embodiment, a separate receiver 2 may be employed for detecting the indication signal S3, e.g. simple circuitry as a dedicated simple HW or a simple HW/SW block within a main receiver. This way, much lower power consumption is obtained, and lower complexity required, compared to using a main receiver otherwise used for reception of data and control information. A UE 1 configured to monitor a channel for the indication signal S3 configured as a wake-up signal may be devised to only switch on its main receiver when the indication signal is detected.

The indication signal S3 is thus configured to convey a reuse instruction to a receiving UE 1 in accordance with the solutions presented herein, and such an indication signal may in various embodiments e.g. be

- a new sequence(s), which differs from the default wake-up signal, and is used to indicate the reuse functionality,
- a cover code used on top of the default wake-up signal which indicates the reuse functionality,
- a phase-shift to the default wake-up signal, where a certain phase shift indicates the reuse functionality, e.g., identification of indexes discussed with reference to FIG. 6.

Assume that the default wake-up signal is one bit information b0 that can be mapped to signal/sequence S0, the above alternatives can then be represented by Si where $k \neq 0$ and $k \in \{1, M\}$ where M is number of indicator, S0·Si where again $k \in \{1, M\}$ where M is number of indicator, and S0·exp(−jkα) $k \in \{1, M\}$ where M is number of indicator.

Note that the sequences or signals are preferably selected such that they have good cross and auto correlation propertied. For instance, they are selected from family of pseudo random (PN) sequences or Zadoff-Chu (ZC) sequences. The good correlation properties are beneficial for providing good detection performance, i.e., low miss and false-alarm probabilities.

Figure 8:
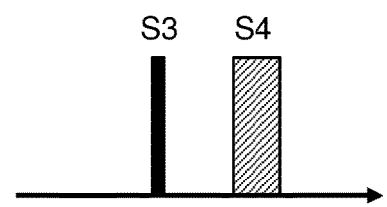
FIG. 8 schematically illustrates signals included in the signaling method of FIG. 7 according to one embodiment.

In various embodiments, as indicated in FIG. 8, the system 60 may need a configurable time in-between an indication signal S3 transmission S103 and the upcoming transmission (e.g. PDSCH) S105 of data S5. Such timing may be signaled by the network 200 or pre-configured via standardized value in technical specifications. As an example, PDSCH may be scheduled for another time slot, in order to ensure ample time for reliable indication signal S3 detection, and potential UE 1 wake up time.

In the described embodiments, the network node 10 will be able to know whether the UE 1 has correctly decoded the previous control signaling, such as S1 or SP0, with which the subsequent indication signal S3 is associated, since control signaling transmissions requires an action and/or behavior by the UE. So, for instance, any ACK or NACK response from the UE 1 will convey the information that the PDCCH has been correctly decoded. In the case of reusing PDCCH scheduling information the network will thus be aware of whether the UE correctly acted on the PDCCH scheduling by handling uplink or downlink data traffic according to the scheduling information. In case the UE correctly acted on the PDCCH scheduling, the network has information that the UE correctly decoded the PDCCH and the network can also reuse the information in the future, and transmit an indication signal S3 to that effect, in accordance with the various embodiments described herein.

At least theoretically, a UE 1 may fail to detect the indication signal S3. In that case the UE 1 will not react on the intended control signaling, as pointed to a previous control information S1 or as provided in a subsequent control information S4 transmission, i.e. it will miss its scheduling assignment. This error could occur also in legacy method of transmitting control signaling and is preferably handled by retransmissions of the control signaling, e.g. re-scheduling of the UE.

Figure 9:
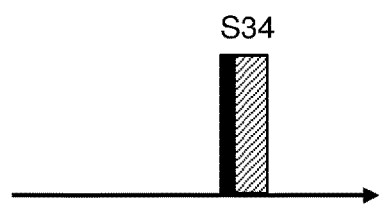
FIG. 9 schematically illustrates signals included in the signaling method of FIG. 7 according to another embodiment.

FIG. 9 illustrates an embodiment, which may be combined with any of the embodiments outlined with reference to FIGS. 4-7. In this embodiment, with regard to signaling reliability, the network node 10 may be configured to enable high detection reliability by multiplexing the indication signal S3, that points towards an earlier control information transmission S1 and a normal/legacy PDCCH transmission, e.g. in the frequency domain, thereby forming a combined signal transmission S34. In an embodiment as described with reference to FIGS. 5 and 6, the PDCCH transmission need not contain and relevant data, where instead the presence of the multiplexed indication signal points to previous control information to be used as obtention information, such as DCI. In an embodiment as described with reference to FIG. 7, the multiplexed indication signal may indicate that DCI information carried in the signal S34 may be decoded by using a previously obtained decoding parameter or value PAR. With The embodiment of FIG. 9, there will not be a network signaling load reduction, but a UE 1 that can detect the multiplexed indication signal in the signal S34 may achieve low energy consumption.

Returning to FIG. 4, configuration of the system 60 to incorporate indication signaling S3 in accordance with any of the described embodiments, may involve signaling and/or default setting. The network 200 may configure the UE 1 to listen for the indication signal S3 in different ways, e.g. by signaling S01. The network 200, through one network node 10, may thus transmit S0110 configuration information S01 related to the indication signal S3, for receipt S011 in the UE 1. The configuration information S01 may be cell-specific configuration indicated in system information or it can be a UE-specific configuration controlled during connection setup procedure, such as Radio Resource Control (RRC) signaling. In some embodiments, configuration of the indication signaling may be partly or wholly prescribed by specification, whereas signaling network S01 may optionally confirm whether the network 200 supports the feature of indication signaling.

In various embodiments, the network 200 may trigger the activation of the feature of indication signaling based on different triggering parameters. The network node 10 may thus be configured to transmit 50210 activation information S02 for receipt in the UE 1, indicating activation or deactivation of indication signal transmission. Triggering parameters may e.g. include detected traffic pattern of certain UEs, control signaling load in the cell served by the network node 10, and UE assistance information indicating a UE request indication signaling to be used. The network 200 may indicate S02 the activation/deactivation of indication signaling via existing PDCCH operation or RRC signaling. Furthermore, the network may specifically indicate time/frequency resources for indication signal S3.

Various embodiments have been disclosed herein by way of example, to illustrate various ways of realizing methods and devices falling within the terms of the claims. Broadly speaking, the embodiments described herein pertain to a solution wherein an indication signal S3 is transmitted from a network node 10 for receipt in a UE 1, wherein the indication signal is configured to either instruct the UE to reuse previously received control information S1, such as DCI, or to reuse a decoding parameter PAR previously used to decode received control information S1. Unless where specifically noted, the embodiments, or features related to those embodiments, described herein may be combined.

The invention claimed is:

1. Method for signaling control information from a network node to a User Equipment, UE, in a wireless communication system, comprising
    transmitting, to the UE on a control channel, first control information associated with a first transmission of first data between the network node and the UE;
    transmitting, to the UE, an indication signal instructing the UE to reuse obtention information associated with the first control information for a further transmission of second data between the network node and the UE, wherein the second data is different from the first data; and
    transmitting second control information associated with the second data transmission,
    wherein said obtention information is indicative of a decoding parameter to be used for decoding the second control information.

2. The method of claim 1, comprising:
    transmitting the first data to the UE, wherein the first control information is associated with receiving the first data in the UE; and
    transmitting the second data from the network node to the UE, wherein said indication signal instructs the UE to reuse the obtention information for receiving the second data in the UE.

3. The method of claim 1, wherein said indication signal instructs the UE to reuse the first control information as said obtention information.

4. The method of claim 3, wherein said indication signal instructs the UE to reuse last received control information.

5. The method of claim 3, wherein said indication signal specifically instructs the UE to reuse control information identified as transmitted with said first control information for receiving the second data in the UE.

6. The method of claim 1, wherein said indication signal is transmitted in lieu of control information dedicated to the second data transmission.

7. The method of claim 1, wherein said indication signal instructs the UE to reuse a last used decoding parameter for decoding control information.

8. The method of claim 1, wherein said indication signal instructs the UE to reuse a decoding parameter identified by the UE as used for decoding the first control information.

9. The method of claim 1, wherein said indication signal is multiplexed with the second control information.

10. The method of claim 1, wherein the indication signal is uncoded.

11. The method of claim 1, wherein the indication signal is a predetermined signal, adapted to indicate a reuse instruction, wherein the indication signal comprises at least one of a predetermined sequence, a phase-shifted signal, a cover-coded signal, a wakeup signal.

12. Method for signaling control information from a network node to a User Equipment, UE, in a wireless communication system, comprising:
    transmitting, to the UE on a control channel, first control information associated with a first transmission of first data between the network node and the UE;
    transmitting, to the UE, an indication signal instructing the UE to reuse obtention information associated with the first control information for a further transmission of second data between the network node and the UE, wherein the second data is different from the first data; and
    transmitting configuration information for receipt in the UE related to the indication signal; and
    transmitting activation information for receipt in the UE, indicating activation or deactivation of indication signal transmission.

13. Method for use in a User Equipment, UE, for signaling with a network node in a wireless communication system, comprising
    receiving, from the access node on a control channel, first control information associated with a first transmission of first data from the network node;
    receiving, from the access node, an indication signal instructing the UE to reuse obtention information associated with the first control information for obtaining second data from a second transmission from the network node, wherein the second data is different from the first data;
    receiving second control information associated with the second data, wherein said obtention information is indicative of a decoding parameter to be used for processing the second control information; and
    using the obtention information to obtain the second data.

14. The method of claim 13, comprising:
    processing the first control information to determine scheduling for receiving data;
    receiving the first data from the access node; and
    receiving the second data from the network node, wherein said indication signal indicates to the UE to reuse the first control information as said obtention information for receiving the second data.

15. The method of claim 13, wherein said indication signal indicates to the UE to reuse last received control information.

16. The method of claim 13, comprising:
    receiving second control information associated with the second data, wherein said obtention information is indicative of a decoding parameter to be used for processing the second control information.

* * * * *